United States Patent
Flikkema

(10) Patent No.: US 10,496,409 B2
(45) Date of Patent: Dec. 3, 2019

(54) METHOD AND SYSTEM FOR MANAGING CONTROL OF INSTRUCTION AND PROCESS EXECUTION IN A PROGRAMMABLE COMPUTING SYSTEM

(71) Applicant: The Arizona Board of Regents, Flagstaff, AZ (US)

(72) Inventor: Paul G. Flikkema, Flagstaff, AZ (US)

(73) Assignee: The Arizona Board of Regents, Flagstaff, AZ (US)

( * ) Notice: Subject to any disclaimer, the term of this patent is extended or adjusted under 35 U.S.C. 154(b) by 86 days.

(21) Appl. No.: 15/820,264

(22) Filed: Nov. 21, 2017

(65) Prior Publication Data

US 2018/0143833 A1 May 24, 2018

Related U.S. Application Data

(60) Provisional application No. 62/425,250, filed on Nov. 22, 2016.

(51) Int. Cl.
*G06F 9/30* (2018.01)
*G06F 9/38* (2018.01)

(52) U.S. Cl.
CPC ........ *G06F 9/30181* (2013.01); *G06F 9/3802* (2013.01)

(58) Field of Classification Search
CPC .................................................. G06F 9/30181
See application file for complete search history.

(56) References Cited

U.S. PATENT DOCUMENTS

| | | |
|---|---|---|
| 3,346,851 A | 10/1967 | Thornton et al. |
| 5,067,069 A | 11/1991 | Fite et al. |
| 5,408,658 A | 4/1995 | Rechtschaffen et al. |
| 5,758,051 A | 5/1998 | Humberto et al. |
| 5,951,689 A | 9/1999 | Evoy et al. |
| 6,081,880 A * | 6/2000 | Sollars ................ G06F 9/30098 345/569 |
| 6,173,389 B1 | 1/2001 | Pechanek et al. |
| 6,243,735 B1 | 6/2001 | Imanishi et al. |
| 6,564,328 B1 | 5/2003 | Grochowski et al. |
| 6,647,485 B2 | 11/2003 | Nguyen et al. |
| 6,988,183 B1 | 1/2006 | Wong |
| 8,639,955 B2 | 1/2014 | Bose et al. |

(Continued)

OTHER PUBLICATIONS

Colwell, Robert P., et al. "A VLIW architecture for a trace scheduling compiler." Computers, IEEE Transactions on 37.8 Aug. 1988: 967-979.

(Continued)

*Primary Examiner* — Michael J Metzger
(74) *Attorney, Agent, or Firm* — Knobbe, Martens, Olson & Bear, LLP

(57) ABSTRACT

Systems and methods for prioritizing executions of a plurality of instructions in a computer system (such as an embedded system) are disclosed. An instruction can be associated with a priority and an atomicity. When an instruction is fetched, the computer system can access the priority and atomicity information together with the accessing the operand and decoding the instruction. The instruction may be executed in accordance with the fetched priority and atomicity. In some situations, the plurality of instructions may be executed in parallel by multiple functional units. Some of the functional units may be the same type, and therefore allowing multiple instructions to use the same type of functional unit at the same time, without waiting for another instruction to finish.

19 Claims, 3 Drawing Sheets

(56) References Cited

U.S. PATENT DOCUMENTS

| | | |
|---|---|---|
| 8,700,938 B2 | 4/2014 | Ghose |
| 8,769,245 B2 | 7/2014 | Hsieh et al. |
| 9,015,352 B2 | 4/2015 | Ramchandran |
| 9,275,002 B2 | 3/2016 | Manet et al. |
| 2005/0005084 A1* | 1/2005 | Burger .................. G06F 9/4494 712/10 |
| 2011/0072239 A1* | 3/2011 | Burger ................ G06F 9/30145 712/29 |
| 2011/0219215 A1 | 9/2011 | Blumrich et al. |
| 2015/0127928 A1* | 5/2015 | Burger .................. G06F 9/3836 712/229 |

OTHER PUBLICATIONS

Faraboschi, Paolo, et al. Lx: A technology platform for customizable VLIW embedded processing. vol. 28. No. 2. ACM, May 2000.

Flikkema, Paul G. et al., "Adapting Processor Architectures for the Periphery of the IoT Nervous Systems," IEEE WF-IOT, Dec. 12-14, 2016 in 6 pages.

Smith, James E., and Gurindar S. Sohi. "The microarchitecture of superscalar processors." Proceedings of the IEEE 83.12 Dec. 1995: 1609-1624.

Tomasulo, Robert M. "An efficient algorithm for exploiting multiple arithmetic units." IBM Journal of research and Development 11.1 Jan. 1967: 25-33.

Tullsen, Dean M., et al. "Exploiting choice: Instruction fetch and issue on an implementable simultaneous multithreading processor." ACM SIGARCH Computer Architecture News. vol. 24. No. 2. ACM, May 1996.

Tullsen, Dean M., Susan J. Eggers, and Henry M. Levy. "Simultaneous multithreading: Maximizing on-chip parallelism." ACM SIGARCH Computer Architecture News. vol. 23. No. 2. ACM, May 1995.

* cited by examiner

METHOD AND SYSTEM FOR MANAGING CONTROL OF INSTRUCTION AND PROCESS EXECUTION IN A PROGRAMMABLE COMPUTING SYSTEM

INCORPORATION BY REFERENCE TO ANY PRIORITY APPLICATIONS

This application claims priority to U.S. Provisional No. 62/425,250, filed Nov. 22, 2016, which is incorporated by reference in its entirety. Any and all priority claims identified in the Application Data Sheet, or any correction thereto, are also hereby incorporated by reference under 37 C.F.R. § 1.57.

FIELD

The present disclosure relates to parallel computing in a microprocessor system, and more particularly to microarchitectures of processors for embedded computing applications, as well as techniques for managing control of instruction and process execution and matching of simultaneous computational demands to resources.

BACKGROUND

In parallel computing, multiple forms of parallelism may be used, such as bit-level, instruction-level, data-level, and thread-level parallelism. For example, a single-instruction multiple-data (SIMD) architecture can be used to process vectors or matrices, e.g., in image processing. Multiple-instruction multiple data (MIMD) may be another form of data-level parallelism, where processing units may perform different tasks on different subsets of data. Very long instruction word (VLIW) architectures can implement a specialized form of MIMD processing in which multiple parallel operations are bundled together at program compilation for simultaneous execution. Another technique in processor architectures for servers, computers, and personal and mobile devices is instruction-level parallelism (ILP). One widely used form of ILP is pipelining. Another more recent and complementary approach, called superscalar, employs the re-ordering of execution of instructions in a single thread to maximize the use of computational resources. Simultaneous multithreading (SMT) is a form of thread-level parallelism. Here, there are multiple simultaneous threads of execution; if execution of one thread stalls while waiting for operands to become available, execution of another can be immediately invoked. Multiple-core architecture is a form of hardware parallelism, wherein the operating system software allocates execution of a process to one of a plurality of processors.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Figure 1:
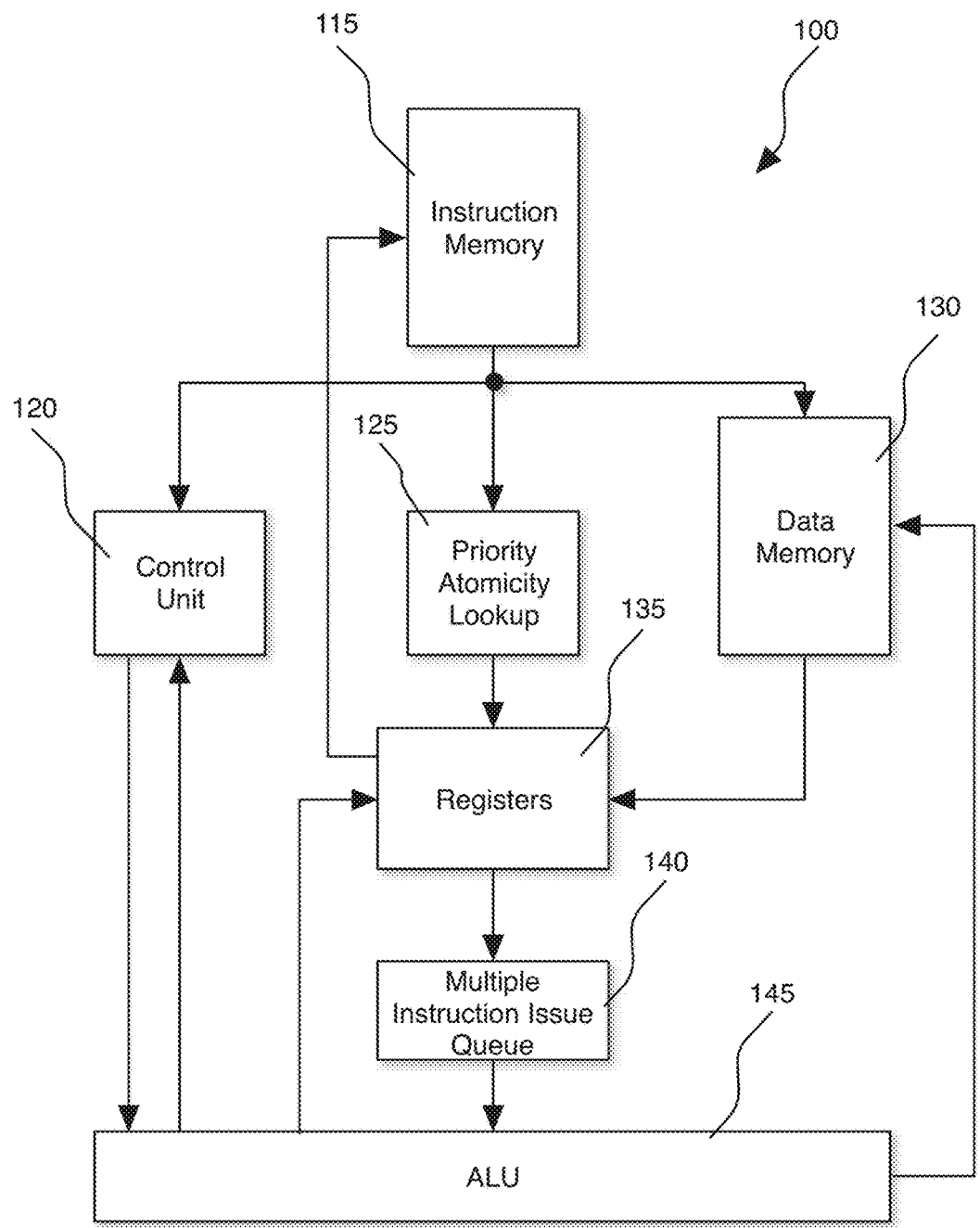
FIG. 1 illustrates a schematic block diagram of a data path portion of a processor wherein priority and atomicity information is merged with individual instructions to be executed by the processor.

Overview of Parallel Computing in Microprocessor Systems

Almost all modern microprocessors, to increase the overall speed at which programs are executed, employ pipelining, wherein the complete processing of an instruction is separated into phases. The set of phases typically includes: fetching the instruction, decoding the instruction, retrieving the operands, execution of the instruction on the operands, and storing the result of the instruction processing. Each phase of processing is performed by a dedicated hardware.

A modern computing device used in an application where the device is embedded in a physical apparatus can employ microcontroller units (MCUs). For example, a microcontroller may be a microprocessor in an embedded system that may be coupled to an electronic device that performs physical functions. The workloads associated with the device have characteristics that differ from those found in personal computers, mobile devices such as smart phones, and high-performance computing servers in data centers. For example, in some embodiments, the workloads are dominated by real-time and near real-time processing of multiple streams of discrete events, rather than the interactive and transactional processing loads managed by personal computers and servers. Innovations in parallelism for high-end processors (such as, e.g., superscalar, simultaneous multi-threading (SMT), and multicore processors) are designed primarily to keep these processors as busy as possible for interactive and transactional workloads. However, the microarchitecture of processors used in embedded systems or "Internet of Things" (IoT) devices include pipelined execution, but do not employ additional structure or functionality to increase parallelism. Furthermore, because workloads of the embedded devices are different than those for servers and personal computers, the type of parallelism should be adapted to these workloads rather than borrowed from existing techniques for servers and personal computers.

A primary characteristic of an executing program (that may also be referred to as a process) is its state. The state of the executing program at a particular time step can be the information necessary for the processor to create the program's state in the next time step by executing an instruction. Accordingly, the processor may need to: (1) store the information that makes up the process' state; and (2) transport the information to computational entities that transform the current state to the next state via arithmetic and logical operations. In the processor's data path, the storage of state information is performed by a set of registers. The computational entities that handle the transformations may be referred to as functional units.

In typical MCUs, the processing of each type of physical event is managed by a separate handler. The ability to react to events is provided by a combination of hardware and software. When an event (often referred to as an interrupt) occurs, it is latched (e.g., recorded) using dedicated hardware. The instruction that is currently being executed may be allowed to complete execution. This instruction may be part of the currently-executing process (CEP). To appropriately respond to the event, the system must suspend execution of the CEP and store its state, which may include the information that is required to resume execution of the process later (e.g., after responding to the event). Once this step is complete, the system can begin executing a process (e.g., the interrupt handler) that services the current event, and clear the hardware storage device in which the event was latched. This latter operation may also be known as "clearing" the interrupt. Once execution of the interrupt handler completes, the system can then recall and restore the state of the CEP and continue its execution.

Many computing systems (such as, e.g., embedded computing systems) may need to simultaneously accomplish multiple computational tasks (such as, e.g., sensing its rotational and translational acceleration). Since the set of functional units has limited resources, an objective of traditional computing systems is to ensure that functional units are in operation as often as possible. Current processors designed for embedded systems, especially those for energy- or power-constrained applications, have functionality that is limited in several ways. First, they employ just one functional unit, called an arithmetic-logic unit (ALU), which may render simultaneous execution of multiple processes impossible. Additionally, the execution of multiple processes may require that the processes be time-multiplexed and prioritized.

The execution of multiple processes can be handled in at least two ways. The first is through hardware interrupts, in which an event is signaled by the change of voltage on a particular circuit path. Processors implement a range of mechanisms for prioritizing interrupts. For example, a processor can prioritize the execution of small sections of program code, called interrupt service routines (ISR's) or interrupt handlers, that are invoked by the processor hardware upon an associated specific change of voltage. Thus, a handler with a higher priority will execute before one with a lower priority when the two associated events occur during the same instruction cycle. In some cases, a higher-priority interrupt handler can interrupt the execution of a lower-priority handler even after the latter has begun execution. Interrupt handlers may need to execute quickly to prevent missing an event that occurs during processing of an event that has occurred previously. As a result, the interrupt handlers can typically include a small number of instructions and hence have a short execution time. Other lower-priority tasks (e.g., background tasks) may need to be subsequently executed to finish the processing. As further described below, these background tasks may be prioritized for execution using a different mechanism than that used for interrupts, which is often implemented in a multi-tasking operating system.

The priority assigned to handlers may be used to resolve conflicts of events. Suppose there are two events, one of type A and another of type B, and the handling of an event of type A is determined by the system designer to be of higher priority than the handling of events of type B. If events of both types occur within the same instruction cycle, the handler for type A events is executed to completion, followed by execution of the handler for the type B events. This is possible because events may be latched by dedicated hardware as described above. If an event of type A occurs first, and an event of type B occurs during execution of the handler for type A events, the type A handler is also allowed to complete before execution of the type B handler. However, if a type A event occurs during execution of the type B handler, rapid response to the higher priority event is enabled by suspending execution of the type B handler, saving its state, executing the type A handler, and then restoring the state of the type B handler and continuing its execution from where it was suspended. The priorities for the plurality of event handlers (which may also be referred as interrupt priorities) can be stored in registers and thus be part of the architecture and microarchitecture of the MCU. These interrupt priorities may be fixed at the time of manufacture, or controllable by the system designer or programmer either at the time the software is compiled of the software or during system operation.

In addition to or in alternative to hardware interrupt priorities, a second way of handling multiple processes can include assigning priorities to processes that are not interrupt handlers (such as, e.g., background processes) which may be: (1) part of the software rather than the hardware, and (2) either implicit, as when processes are executed in round-robin fashion, or explicit, as when software for control of the system provides them. This software may be known as an executive or an operating system. Whether explicit or implicit, the system designer may need to be cognizant of the potential complexity of interactions between processes that may occur due to the two types of priorities. The problem can also be compounded by the fact that the execution of the handlers for physical events will likely to trigger software events (rather than hardware events) that need to be handled by other processes.

The combination of hardware support of interrupt handler execution priorities and software support of follow-on tasks makes current architectures and microarchitectures a poor fit to the workloads dominated by multiple sensing and actuation tasks in which asynchronous streams of physical events are processed, stored, and transmitted. This is at least in part because events in these streams can be unpredictable, and events in multiple streams can occur during the same instruction cycle. The current architectures in the processors of MCUs are not well-suited to this deeply parallel functionality because the single functional unit employed by the MCU (e.g., the ALU) can only execute one instruction at a time. Even if there are a multiplicity of functional units enabling parallel execution of multiple processes, conflicts over the limited resources of the functional units may still arise. Thus, a means of enabling the prioritized allocation of functional units is needed.

Additionally, the complexity in the interactions between the interrupt priorities and other priorities assigned processes that are not interrupt handlers can make it difficult to develop software that is immune to the deleterious effects of interactions that may occur once the system is in operation. For example, issues may arise due to interactions between handlers and other processes that were not envisioned by the designer, or due to later changes in the software, and may occur years after the design is complete.

In addition to or in alternative to the software and hardware mechanisms for handling interrupts, problems also can arise in the efficiency of the operation and the power consumption in a parallel architecture. Various methods may be used to increase the efficiency and reduce power usage in parallel computing. For example, a parallel architecture can have multiple processing elements that include a register file, an instruction decoder/scheduler, or a set of execution units. The scheduling of multiple instructions for execution by multiple processing elements may be based on the anticipated availability of processing elements. To increase efficiency of operation, data flow can be reconfigured to minimize register accesses for different operations.

To reduce power use, computing resources such as an issue queue in a pipeline can be dynamically sized. As another example of reducing power use, a hierarchical architecture may be provided for monitoring and controlling power usage in a multicore system, such that the higher levels provide modes of operation and budgets to lower levels and the lower levels provide feedback to the higher levels to control and manage power usage in the microprocessor system. As a further example, in a VLIW architecture, the power flow to execution units may be determined by the sub-instruction for each unit, and where no-operation (NOP) sub-instructions place a unit into a reduced power consumption state.

Another aspect of processor performance is the delay from the occurrence of an event to the invocation of execution of the associated interrupt handler. One factor contributing to this delay in current embedded processors can be saving the state of the CEP in order to successfully continue execution of that process once the event is processed by the handler. To reduce the delay, scoreboarding may be used. In scoreboarding, each functional unit can include a single-instruction buffer. Further, operands can be dynamically associated with issued instructions in an architecture with a plurality of functional units. A more elaborate method can queue instructions and data together in a multi-station buffer (where each station can be referred to as a reservation station), and use tags to label results from the functional units that indicate the destination buffer. As another example, in a VLIW architecture, instructions may specify operands on specific communication links. As a further example, point-to-point communication links between processing elements multiprocessing may be used in a VLIW architecture to increase microprocessor's performance.

The techniques described herein can improve the performance of the microprocessor systems as well as address the problems in processing workloads dominated by multiple sensing and actuation tasks in which asynchronous streams of physical events are processed, stored, and transmitted. The systems and methods described herein can advantageously, in some embodiments, provide a unified micro-architectural support for: (a) unified models of prioritized execution for all processes in a system including physical event handlers, (b) simultaneous execution of processes where possible, and (c) prioritized execution of processes when simultaneous execution is not possible due to conflicts in the use of functional units. For example, the systems and methods describe techniques for structuring, storing, and retrieving information to control the relative priorities for execution of instructions in a programmable computer, to allow the simultaneous execution of multiple prioritized instructions in the programmable computer, and to control of the flow of power to a plurality of functional units executing the instructions in priority order. The techniques described herein can: (1) reduce the power consumption, (2) increase utilization of resources, and (3) increase programming efficiency in computational devices. As further described below, the ability of the processor to execute multiple instructions simultaneously can include the parallel execution of interrupt handlers and currently-executing processes. Since this parallelism means that processes needed not be suspended and states need not be saved, there may be no delay, or latency, in handling the event.

Example Architecture for Managing Control of Instructions and Process Executions To improve operational efficiencies and to achieve fine-scaled task execution for handling multiple event streams, the hardware mechanisms can integrate support of two key characteristics of executing programs: (1) priority (e.g., which tasks are awarded processor resources, in particular functional units) and (2) atomicity (e.g., how long winning tasks can hold onto those resources). The priority and atomicity information may be merged with fetched instructions for execution.

For example, if multiple instructions are ready for execution, but there are not enough functional units to execute them simultaneously, the instruction with the highest priority may be executed first. Atomicity can be complementary to priority. Atomicity can designate a contiguous, sequential set of instructions as a single operation, thus enabling the labeling of segments of programs that must execute as one operation. In some implementations, atomicity can identify (e.g., to the microprocessor) a segment of a program to execute at the highest possible priority, and hence not be interrupted by any other executing process, once the first instruction of that segment is issued for execution.

These techniques can provide hardware support for two types of processes: (1) interrupt handlers that support processing of events and (2) background or follow-on processes. Each type of process can include program segments that must be executed as one operation. These program segments (which may also be referred to as critical sections) can normally be used to manage the states of multiple processes while they are accessing shared resources that are external to the processor, such as main memory. For both concepts, the impact on software developers may be reduced compared to existing means (such as, e.g., coding the interactions among various handlers), and thereby enabling the software developers to simply label functions or code sections with priority and atomicity information. The features described can also delegate the interaction coordination to the hardware thereby streamlining the instructions compiled for execution. Detailed examples are further described with reference to FIGS. 1 and 2.

FIG. 1 illustrates a schematic block diagram of a data path portion of a processor wherein priority and atomicity information is merged with individual instructions to be executed by a processor. The computing system 100 in FIG. 1 (which may be implemented by the processor) can include a data store, such as an instruction memory 115, which can store a computer instruction (which may be part of a process compiled or loaded for execution by the processor), a control unit 120 which can decode instructions into control signals, a priority/atomicity look up unit 125 which can determine the priority and the atomicity associated with an instruction, a data memory 130 which can store operands, registers 135 which can store the state information and aid the execution of the instruction, a multiple instruction issue queue 140 which can hold instructions (such as, e.g., vector operations) waiting to be executed, and an ALU 145. The ALU 145 can be the destination of operands and the control signals generated from the instruction by the control unit 120 and can execute the instruction by communicating with the control unit 120, the registers 135, and the data memory 130. The computing system 100 can also include instruction merge circuitry (not shown in FIG. 1) configured to combine the instruction with the priority and the atomicity of the instruction to form a merged instruction for execution according to the priority and the atomicity. The instruction merge circuitry may be associated with at least a portion of the processor which can implement the computing system 100.

The instruction can further be routed to priority/atomicity lookup unit 125 for determining the priority of the instruction and the atomicity of its containing code segments. The priority/atomicity lookup unit 125 can include the encoded information that is associated with every instruction, including a unique identifier of the process (e.g., the executing program) that the instruction is associated with as well as the instruction's priority and atomicity. The priority/atomicity lookup unit 125 can receive, as the input, the possible range of memory addresses associated with the instruction, and output the unique process identifier, priority, and atomicity. In one embodiment of the priority/atomicity lookup unit 125, the priority/atomicity information is computed from the instruction address(es) using combinational logic. In a second embodiment, the priority/atomicity lookup unit 125 is implemented as an associative memory or content-addressable memory. In a third embodiment, the priority/atomicity lookup unit 125 is implemented as a combination of combinational logic and a variety of memory architectures, including associative or content-addressable memories. Although not described in these three embodiments, other embodiments of the encoding and storage of the priority and atomicity information are also possible. The functionalities of the priority/atomicity lookup unit 125 may be implemented using a wide range of microelectronics technologies, including but not limited to complementary metal-on-silicon (CMOS) logic, static or dynamic random-access memory (RAM), ferroelectric memories, or resistive RAM. Furthermore, the priority/atomicity information may be stored or encoded by the programmer or programming device/algorithm via annotation of functions, code segments, or individual instructions.

The unique identifier as well as the priority and atomicity information of the instruction may be passed from the priority/atomicity lookup unit 125 to the registers 135. This information can further be communicated from the registers 135 to the multiple instruction issue queue 140 along with the instruction and operands.

If the instruction references operands located in the data memory 130 of the system, operand address information in the instruction can also be routed to the data memory 130.

Figure 2:
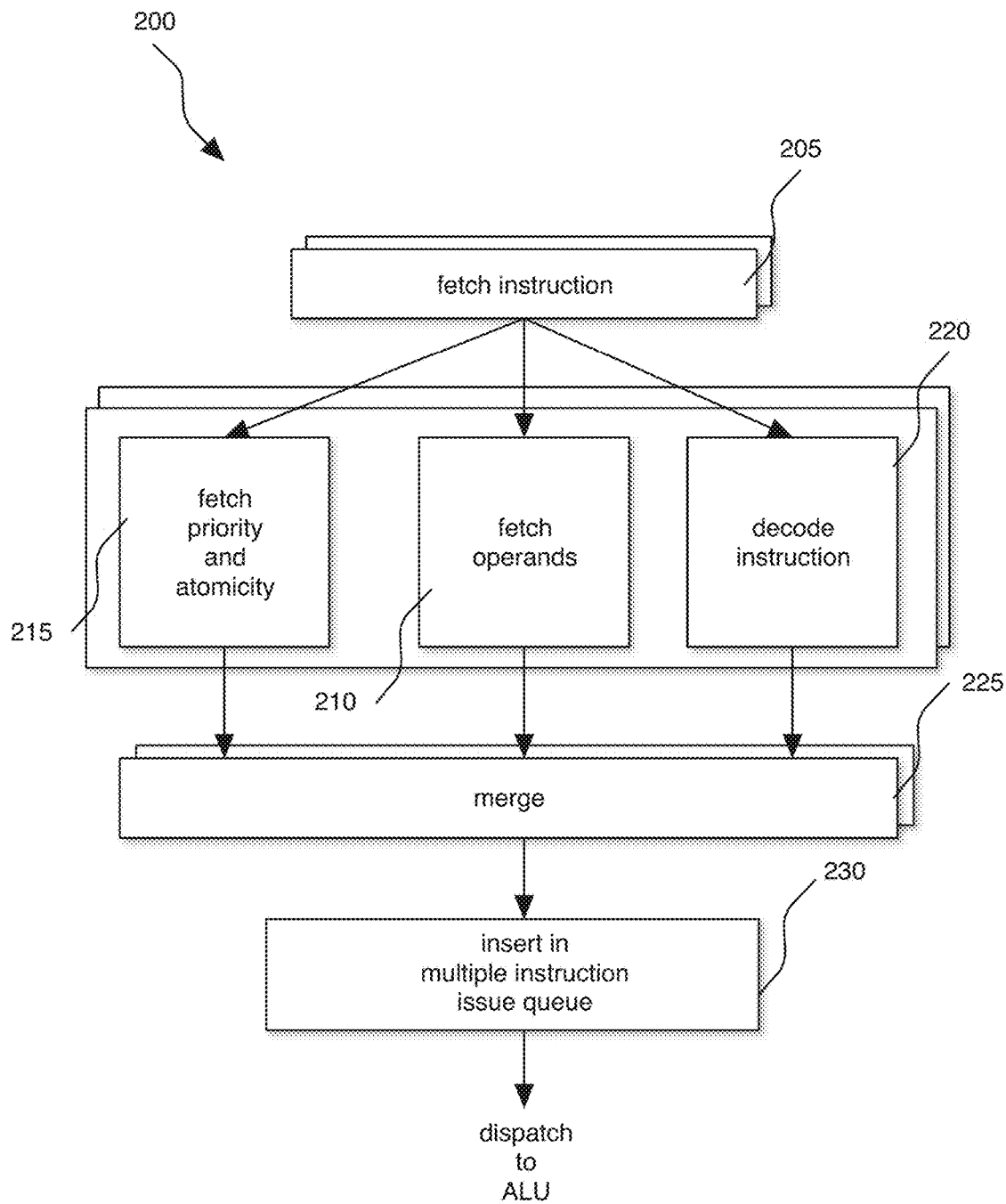
FIG. 2 illustrates a flow diagram of integrating priority and atomicity information with instructions executed by a processor.

FIG. 2 is a flow diagram of integrating priority and atomicity information with instructions executed by a processor. The processor may include elements similar to those shown in the computing system 100 of FIG. 1.

At block 205, an instruction is fetched. The instruction may be part of an executing program. The instruction can be fetched from the instruction memory 115. The instruction may be fetched in response to initiation of a process comprising the instruction or in response to the execution (or the termination of execution) of another instruction. The instruction can be routed to the blocks 215, 210, and 220 for processing. At block 215, the instruction is processed to obtain the process identifier, priority, and atomicity information. Block 215 may be performed by the priority/atomicity lookup unit 125 in FIG. 1. To retrieve the priority and the atomicity of the instruction using a range of memory addresses, the priority and atomicity look up unit may compute the priority and the atomicity of the instruction from the range of memory addresses using a combinational logic. The priority/atomicity lookup unit 125 can also communicate with a data store to retrieve the priority and atomicity information. In some implementations, the priority/atomicity lookup unit 125 may search the priority and the atomicity of the instruction using the range of memory addresses as an input, wherein the priority and atomicity lookup unit comprises an associative memory or content-addressable memory. Block 215 may be initiated in response to detecting that the instruction is fetched (e.g., block 205).

Operands are fetched in block 210. For example, the processor can parse the instruction and identify the operands. The processor can also communicate with the data memory 130 (shown in FIG. 1) if the instruction involves an operand (such as by providing the address for referencing the operand) located in the data memory 130. In some situations, the block 210 may be optional because an instruction may not be associated with an operand. For example, instructions such as call, jump, and return do not have operands.

At block 220, the instruction is decoded. This block may be performed by the control unit 120 shown in FIG. 1 that can decode the instructions and generate control signals which are used to guide the operands associated with the instruction to an appropriate functional unit for execution of the operation prescribed by the instruction.

At block 225, the priority and atomicity information, operands, and decoded instructions may be merged to generate a merged instruction-operand tuple. The merged instruction-operand tuple may be generated by the instruction merge circuitry (described with reference to FIG. 1) that receives the decoded instruction, operands, and priority/atomicity information and outputs a merged instruction-operand tuple. As described herein, the merged instruction-operand tuple may not include an operand if the instruction is not associated with an operand. The merged instruction-operand tuple may be inserted into the multiple instruction issue queue at block 230. The control unit (shown at 120 in FIG. 1) accomplishes dispatch of information in the merged instruction such as the instruction and operands to the ALU (shown at 145 in FIG. 1) using the priority and/or atomicity included in the merged instruction-operand tuple. For example, an instruction associated with a higher priority than another instruction may be executed before the lower priority instruction. If the atomicity for the high priority instruction indicates a relationship with a third instruction, this third instruction may be executed with a similar priority as the high priority instruction. Accordingly, the processor can efficiently manage the resources when executing one or more processes.

The blocks 205, 215, 210, 220, and 225 are illustrated in stacked blocks to indicate that a plurality of these blocks can be used to enable simultaneous execution of multiple processes. For example, block 205 indicates that fetching instructions for multiple processes can occur simultaneously. As another example, multiple processes may simultaneously fetch priority and atomicity information (shown in block 215), fetch operands (shown in block 215), or decode instructions (shown in block 220). Fetching priority and atomicity, fetching operands, and decoding an instruction may also occur simultaneously. The simultaneous execution of multiple processes can advantageously motivate the priority and atomicity management of multiple streams of instructions.

Examples of Prioritized and Simultaneous Execution of Multiple Prioritized Instructions Since most task invocations are sporadic and asynchronous, it is likely that two tasks will not need the same function (e.g., arithmetic, logical, floating-point, crypto-primitive) in the same instruction cycle. Thus, to more efficiently utilize computing resources to achieve parallel computing, the monolithic ALU in current MCU architectures may be replaced by a plurality of heterogeneous functional units, including pluralities of functional units of the same type, operating on demand and in parallel. This implementation can advantageously result in nearly independent use of computational resources to improve both throughput and energy efficiency when executing multiple prioritized instructions.

For example, the composition of the plurality of functional units can be adapted to the presented workload, increasing throughput. This adaptation can occur at tape-out based on the expected workload, or later and at finer time scales using field-programmable substrates. Functional units not being used may be depowered, increasing energy efficiency.

Figure 3:
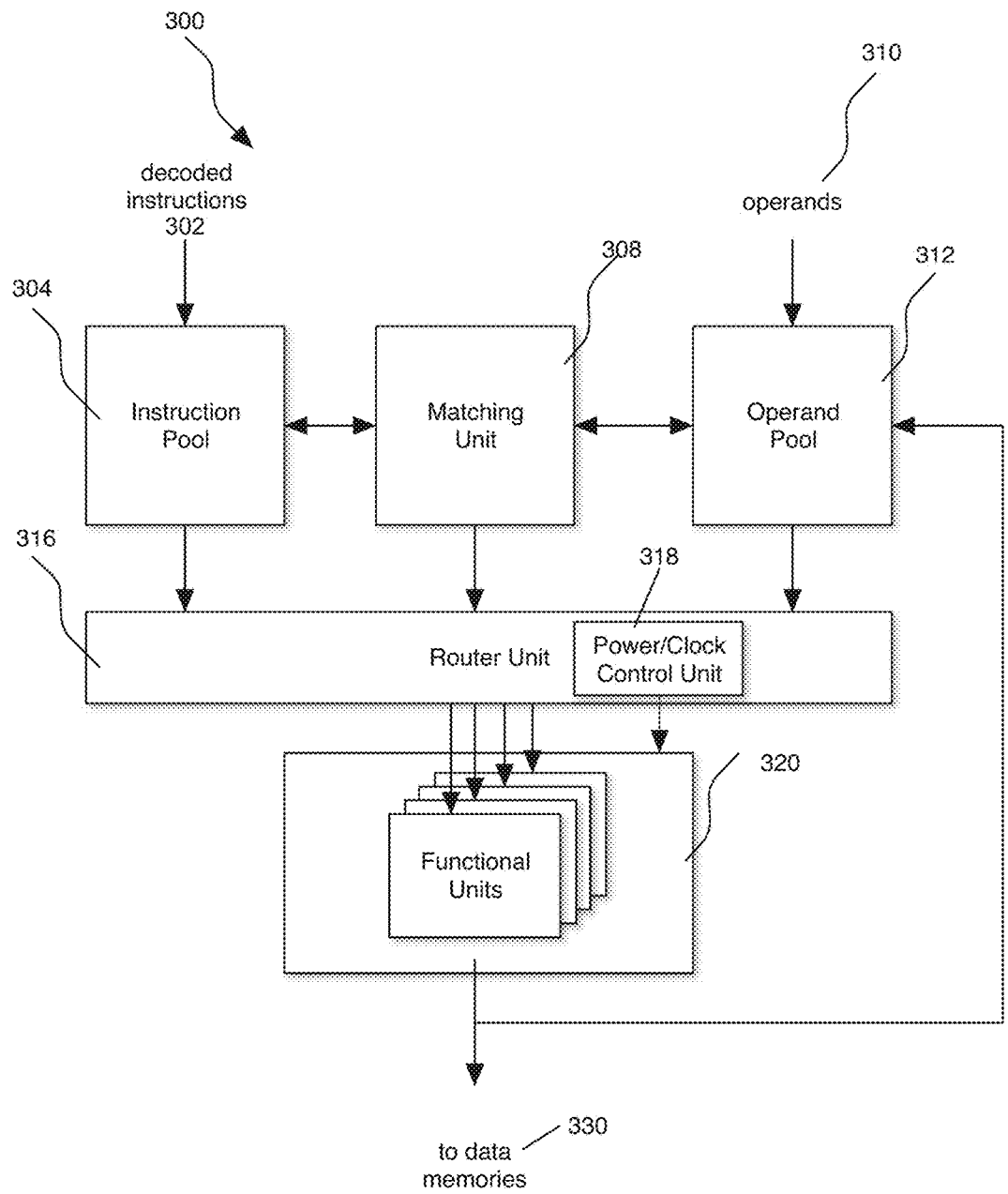
FIG. 3 illustrates a schematic block diagram of a computing environment for issuing and executing multiple prioritized instructions simultaneously in a plurality of processor units.

FIG. 3 is a schematic block diagram of a computing environment 300 for issuing and executing multiple prioritized instructions simultaneously to a plurality of processor units. In the computing environment 300, there may be a plurality of functional units of the same type, and conflicts in the use of functional units may be resolved by explicit priority and atomicity information that is merged with instructions (such as the merged instructions or the merged instruction-operand tuples as described with reference to FIGS. 1 and 2).

In the computing environment 300, the decoded instructions 302 can be cached in an instruction pool 304. Operands 310 can also be fetched and placed in the operand pool 312. In some implementations, the control unit (e.g., control unit 120 shown in FIG. 1) may be used to decode the instruction and generate addresses for the operands to be fetched. In some situations, the instruction may not have an operand. However, in situations where the instruction does have an operand, the availability of operands in the operand pool 312 for a particular decoded instruction in the instruction pool 304 may be determined by the matching unit 308. When all operands for a particular decoded instruction are available, the instruction and operands can be transported to the router unit 316. In some embodiments, if the decoded instruction is associated with one or more operands, the matching unit 308 can match the one or more operands with the decoded instruction to generate an instruction-operand tuple and communicate the instruction-operand tuple to a functional unit for execution.

The computing environment 300 includes a plurality of functional units 320 that can implement the computations specified in the processor's instruction set. For example, the set of functional units 320 may implement logical functions, fixed- and floating-point arithmetic functions, or memory functions (such as load and store, where a fixed-point functional unit may be used to compute an address). The router unit 316 can allocate functional units 320 to instruction-operand tuples, and issue the tuples to the functional units for execution. For example, the router unit 316 can instruct a functional unit to execute an instruction-operand tuple for an instruction or a segment of the instruction when the operand is available in the operand pool. If more than one tuple is ready for a particular functional unit, there may be two possible scenarios. If the instructions of the tuples have different priorities, the higher-priority instruction may be executed first. If they have the same priorities, the tuple whose instruction arrived first in the instruction pool 304 may be issued for execution first. In situations where the instruction is associated with one or more operand(s), the tuple can be executed first if the operand(s) associated with the instruction are also available.

The router unit 316 can include a power/clock control unit 318 that dispatches power and/or gates clock signals to each functional unit as a function of its use in the current clock cycle. Depending on the microelectronic technology of the implementation, the power/clock control unit can control either or both of power or clocking of the functional units 320. Clock gating can save dynamic power in switching circuits. Power dispatch may be more expensive and can result in large variations in current demand, but can minimize overall energy use.

When a functional unit completes its processing of operands according to the associated instruction, it can release its result(s) to a bus that enables transfer of the result(s) to a main memory (which may be external to the processor), a data memory 330 (which may be an embodiment of the data memory 130), or the operand pool 312. All results may be tagged with an identifier that enables access to and use of the operand in subsequently-executed instructions. The tagging technique may be similar to that used in scoreboarding or reservation stations.

In some embodiments, the instruction pool 304 can advantageously be structured as a set of queues. Each queue can contain instructions for an active process. These queues can be maintained in first-in/first-out (FIFO) order in simpler processors, or can implement mechanisms that exploit instruction-level parallelism (ILP) within the process, where instructions may be executed out of order as long as the process' state trajectory is maintained.

The functional units 320 may include multiple functional units of the same type. For example, a set of processes that uses a large number of floating-point computations can be accommodated by a set of functional units with multiple floating-point functional units.

Additional Example Implementations

In one embodiment, a microprocessor computer system for prioritized executions of a plurality of instructions in an embedded computer system is disclosed. The microprocessor computer system comprising: a data store configured to store a plurality of instructions of a process and information associated with the plurality of instructions. The information associated with the plurality of instructions comprises an identifier associated with the process, priorities of the respective instructions of the plurality of instructions, and atomicities associated with one or more groups of instructions of the plurality of instructions. The microprocessor computer system further comprises a control unit configured to communicate with the data store to fetch the plurality of instructions. For each instruction of the plurality of instructions, the control unit can parse the instruction to identify an operand or operands in the instruction or referenced in the instruction; communicate with the data store to retrieve the referenced operand or operands; and decode the instruction into one or more control signals. The microprocessor computer system can also include a priority and atomicity look up unit which is configured to determine a range of memory addresses associated with the instruction and retrieve a priority and an atomicity of the instruction using the range of memory addresses for each instruction of the plurality of instructions. The microprocessor computer system can further include an instruction merge circuitry configured to combine the instruction with the priority and the atomicity of the instruction to form a merged instruction for execution according to the priority and atomicity. The instruction merge circuity may be part of the control unit.

In another embodiment, a method for prioritized executions of a plurality of instructions in a computer system is disclosed. The method comprises loading a plurality of instructions of a process and information associated with the plurality of instructions into one or more data storage entities, wherein the information associated with the plurality of instructions comprising an identifier of the process as well as priorities and atomicities for respective instructions in the plurality of instructions. The data storage entities may include a data memory or a data store external to a microprocessor of the embedded computer system. For each instruction of the process, the method comprises: fetching the identifier of the process and a priority and an atomicity of the instruction; determining whether the instruction is associated with one or more operands; in response to a determination that the instruction is associated with one or more operands, fetching the one or more operands associated with the instruction; merging the fetched identifier, the priority, and the atomicity of the instruction, the fetched one or more operands to generate a merged instruction-operand tuple; generating one or more control signals for the merged instruction-operand tuple, wherein the one or more control signals are used by one or more functional units for controlling an execution of the merged instruction-operand tuple; and communicating the merged instruction-operand tuple to a multiple instruction issue queue for execution by the one or more functional units.

In a certain embodiment, a computer system for controlling an order of execution of merged instruction-operand tuples in a programmable computer is disclosed. The computer system comprises a plurality of functional units configured to execute a plurality of merged instruction-operand tuples wherein each merged instruction-operand tuple is associated with a priority and an atomicity and comprises one or more decoded instructions. A merged instruction-operand tuple may also comprise one or more operands if the instruction in the merged instruction-operand tuple is associated with the one or more operands. The computer system also comprises a router unit configured to allocate one or more functional units to execute a merged instruction-operand tuples of the plurality of instruction-operand tuples, and control a flow of power and clock pulses of the plurality of functional units by dispatching power and gate clock signals to the plurality of functional units, wherein the flow of power and clock pulses activates the one or more functional units allocated to execute the merged instruction-operand tuple and deactivates functional units not allocated to execute the instruction-operand tuple. The computer system can further comprise an operand pool configured to store a plurality of operands for at least a portion of a plurality of instructions and communicate the one or more operands of the merged instruction-operand tuple to the router unit in response to a determination that the merged instruction-operand tuple comprises one or more operands and all of the one or more operands of the merged instruction-operand tuple are available, as well as an instruction pool configured to store a plurality of decoded merged instructions, wherein each decoded merged instruction comprises a decoded instruction merged with the priority and atomicity of the decoded instruction and communicate a decoded merged instruction of the plurality of decoded merged instructions to the router unit in response to the determination that all of the one or more operands of the merged instruction-operand tuple are available. The computer system can include a matching unit configured to determine availability of the one or more operands of the merged instruction-operand tuple in the operand pool if the merged instruction-operand tuple includes the one or more operands.

In yet another embodiment, a method for controlling an order of execution of instructions in a programmable computer is disclosed. The method comprises accessing a plurality of merged instructions, wherein each merged instruction comprises one or more decoded instructions and is associated with a priority and an atomicity; determining a priority order based on the priority and atomicity of each merged instruction in the plurality of merged instructions; assigning functional units to the plurality of merged instructions based at least partly on the priority order. In response to a determination that all operands associated with a decoded instruction are available, the method comprises matching the operands with the decoded instruction to generate an instruction-operand tuple; and communicating the instruction-operand tuple to a functional unit for execution.

Additional aspects of the disclosures are further provided below.

In a 1st aspect, a microprocessor computer system for prioritized execution of a plurality of instructions in an embedded computer system, the microprocessor computer system comprising: a data store configured to store: a plurality of instructions of a process; and information associated with the plurality of instructions comprising: an identifier associated with the process; priorities of the respective instructions of the plurality of instructions; and atomicities associated with one or more groups of instructions of the plurality of instructions; a control unit configured to: communicate with the data store to fetch the plurality of instructions; and for each instruction of the plurality of instructions: parse the instruction to identify an operand or operands in the instruction or referenced in the instruction; communicate with the data store to retrieve the referenced operand(s); and decode the instruction into one or more control signals; a priority and atomicity look up unit configured to, for each instruction of the plurality of instructions: determine a range of memory addresses associated with the instruction; and retrieve a priority and an atomicity of the instruction using the range of memory addresses; and an instruction merge circuitry configured to combine the instruction with the priority and the atomicity of the instruction to form a merged instruction for execution according to the priority and the atomicity.

In a 2nd aspect, the microprocessor computer system of aspect 1, wherein the information associated with the plurality of instructions is encoded.

In a 3rd aspect, the microprocessor computer system of any one of aspects 1-2, wherein retrieving the priority and the atomicity of the instruction is executed in parallel with at least one of: (i) decoding the instruction into the control signal or (ii) retrieving the operand.

In a 4th aspect, the microprocessor computer system of any one of aspects 1-3, wherein to retrieve the priority and the atomicity of the instruction using the range of memory addresses, the priority and atomicity look up unit is configured to perform at least one of the following: communicate with the data store to retrieve the priority and the atomicity of the instruction; compute the priority and the atomicity of the instruction from the range of memory addresses using a combinational logic; or search the priority and the atomicity of the instruction using the range of memory addresses as an input, wherein the priority and atomicity lookup unit comprises an associative memory or content-addressable memory.

In a 5th aspect, the microprocessor computer system of any one of aspects 1-4, wherein the microprocessor computer system is further configured to initiate storage of the plurality of instructions and the priorities and the atomicities associated with the plurality of instructions when the process is loaded to an embedded computer system or dynamically when the microprocessor computer system of the embedded computer system is executing the process.

In a 6th aspect, the microprocessor computer system of any one of aspects 1-5, wherein the priority and the atomicity of the instruction is retrieved in response to a determination that the instruction is fetched from the data store.

In a 7th aspect, the microprocessor computer system of any one of aspects 1-6, wherein the priority and atomicity look up unit is further configured to retrieve an identifier of the process.

In an 8th aspect, the microprocessor computer system of any one of aspects 1-7, wherein the data store comprises: an instruction memory configured to store the plurality of instructions; and a data memory configured to store operands.

In a 9th aspect, a computer-implemented method for prioritized executions of a plurality of instructions in a computer system, the method comprising: under control of one or more hardware processors; loading a plurality of instructions of a process and information associated with the plurality of instructions into one or more data storage entities, wherein the information associated with the plurality of instructions comprising an identifier of the process as well as priorities and atomicities for respective instructions in the plurality of instructions; for each instruction of the process: fetching the identifier of the process and a priority and an atomicity of the instruction from a data storage entity; determining whether the instruction is associated with one or more operands; in response to a determination that the instruction is associated with one or more operands, fetching the one or more operands associated with the instruction; merging the fetched identifier, the priority, and the atomicity of the instruction, the fetched one or more operands in or associated with the instruction to generate a merged instruction-operand tuple; generating one or more control signals for the merged instruction-operand tuple, wherein the one or more control signals are used by one or more functional units for controlling an execution of the merged instruction-operand tuple; and communicating the merged instruction-operand tuple to a multiple instruction issue queue for execution by the one or more functional units.

In a 10th aspect, the computer-implemented method of aspect 9, wherein the information associated with the plurality of instructions is encoded.

In an 11th aspect, the computer-implemented method of any one of aspects 9-10, wherein two or more of the following are executed simultaneously: fetching the identifier of the process and a priority and an atomicity of the instruction; fetching the one or more operands associated with the instruction; or generating the one or more control signals.

In a 12th aspect, the computer-implemented method of any one of aspects 9-11, wherein fetching the identifier of the process and a priority and an atomicity of the instruction comprises at least one of: computing the priority and the atomicity of the instruction from a range of memory addresses associated with the instruction using a combinational logic; or searching for the priority and the atomicity of the instruction using the range of memory addresses as an input.

In a 13th aspect, the computer-implemented method of any one of aspects 9-12, wherein loading the plurality of instructions of the process and information associated with the plurality of instructions occurs dynamically when the computer system is executing the process.

In a 14th aspect, the computer-implemented method of any one of aspects 9-13, wherein the priority and atomicity of the instruction is retrieved in response to a determination that the instruction is fetched from the one or more data storage entities.

In a 15th aspect, a system for controlling an order of execution of merged instruction-operand tuples in a programmable computer, the system comprising: a plurality of functional units configured to execute a plurality of merged instruction-operand tuples wherein each merged instruction-operand tuple is associated with a priority and an atomicity and comprises one or more decoded instructions, and wherein a merged instruction-operand tuple comprises one or more operands in response to a determination that an instruction in the merged instruction-operand tuple is associated with the one or more operands; a router unit configured to: allocate one or more functional units to execute a merged instruction-operand tuple of the plurality of merged instruction-operand tuples; and control a flow of power and clock pulses of the plurality of functional units by dispatching power and gate clock signals to the plurality of functional units, wherein the flow of power and clock pulses activates the one or more functional units allocated to execute the merged instruction-operand tuple and deactivates functional units not allocated to execute the merged instruction-operand tuple; an operand pool configured to: store a plurality of operands for at least a portion of a plurality of instructions; and communicate the one or more operands of the merged instruction-operand tuple to the router unit in response to a determination that the merged instruction-operand tuple comprises one or more operands and that all of the one or more operands of the merged instruction-operand tuple are available; an instruction pool configured to: store a plurality of decoded merged instructions, wherein each decoded merged instruction comprises a decoded instruction merged with the priority and atomicity of the decoded instruction; and communicate a decoded merged instruction of the plurality of decoded merged instructions to the router unit in response to the determination that the merged instruction-operand tuple comprises one or more operands and all of the one or more operands of the merged instruction-operand tuple are available; and a matching unit configured to determine availability of the one or more operands of the merged instruction-operand tuple in the operand pool in response to the determination that the merged instruction-operand tuple comprises the one or more operands.

In a 16th aspect, the system of aspect 15, wherein the router unit is configured to allocate the functional unit and control the flow of power and clock pulses based at least partly on a priority order determined from priorities and atomicities of respective merged instruction-operand tuples in the plurality of instruction-operand tuples.

In a 17th aspect, the system of aspect 16, wherein a merged instruction-operand tuple with higher priority is executed before a merged instruction-operand tuple with a lower priority.

In an 18th aspect, the system of any one of aspects 16-17, wherein a first merged instruction-operand tuple and a second merged instruction-operand tuple each comprise one or more operands, and wherein in response to a determination that the first merged instruction-operand tuple and the second merged instruction-operand tuple have the same priority and all operands for the first merged instruction-operand tuple and the second merged instruction-operand tuple are available, the merged instruction-operand tuple associated with the decoded instruction that is placed in the instruction pool first is executed first.

In a 19th aspect, the system of any one of aspects 15-18, wherein the plurality of functional units is associated with more than one type and comprises two or more functional units of a same type.

In a 20th aspect, the system of aspect 19, wherein at least two of the plurality of merged instruction-operand tuples are executed in parallel. In this aspect 20, the at least two of the plurality of merged instruction-operand tuples can be executed by different functional units in parallel. This aspect 20 can be applicable in a different situation as the aspect 29 below where the aspect 20 can occurs when the at least two of the plurality of merged instruction-operand tuples do not have to compete for the same functional unit, while aspect 29 can occur when the at least two of the plurality of merged instruction-operand tuples are competing for the same functional unit.

In a 21th aspect, the system of any one of aspects 16-20, wherein the merged instruction further comprises a plurality of segments where each segment is associated with an instruction and a set of operands and is associated with a priority and an atomicity; and wherein the router unit allocates the instruction and the set of operands to appropriate functional units for execution based on the priority and atomicity of the segment.

In a 22nd aspect, the system of aspect 21, wherein sets of instructions and operands for respective segments in the plurality of segments are allocated to multiple functional units for simultaneous execution.

In a 23rd aspect, the system of any one of aspects 15-22, wherein a functional unit is configured to release a result generated from executing the merged instruction-operand tuple to a bus for transfer to at least one of a data store or the operand pool.

In a 24th aspect, the system of aspect 23, wherein the result is tagged with an identifier and is accessible for subsequent merged instructions.

In a 25th aspect, the system of any one of aspects 23-24, wherein the router unit is further configured to allocate a functional unit to join the one or more decoded instructions and the one or more operands of the merged instruction referenced by the one or more decoded instructions.

In a 26th aspect, a computer-implemented method for controlling an order of execution of instructions in a programmable computer, comprising: under control of one or more hardware processors, accessing a plurality of merged instructions, wherein each merged instruction comprises one or more decoded instructions and is associated with a priority and an atomicity; determining a priority order based on the priority and atomicity of each merged instruction in the plurality of merged instructions; assigning functional units to the plurality of merged instructions based at least partly on the priority order; in response to a determination that all operands associated with a decoded instruction are available: matching the operands with the decoded instruction to generate an instruction operand tuple; and communicating the instruction-operand tuple to a functional unit for execution.

In a 27th aspect, the computer-implemented method of aspect 26, further comprising controlling the flow of power and clock pulses of the functional units based on the priority order.

In a 28th aspect, the computer-implemented method of any one of aspects 26-27, wherein an instruction-operand tuple with higher priority is executed before an instruction-operand tuple with a lower priority.

In a 29th aspect, the computer-implemented method of aspect 26-28, wherein in response to a determination that a first instruction-operand tuple and a second instruction-operand tuple have the same priority, the instruction-operand tuple associated with the decoded instruction placed in an instruction pool first is executed first. The computer-implemented method of this aspect 29 can be applicable where the first instruction-operand tuple and the second instruction-operand tuple are competing for the same functional unit.

In a 30th aspect, the computer-implemented method of any one of aspects 26-29, wherein the functional units include two or more functional units of a same type.

In a 31st aspect, the computer-implemented method of any one of aspects 26-30, wherein at least two of the plurality of merged instructions are executed in parallel.

In a 32nd aspect, the computer-implemented method of any one of aspects 26-31 wherein a merged instruction of the plurality of merged instructions comprises multiple instruction-operand tuples, wherein an operand in the instruction-operand tuple is routed to appropriate functional units according a priority and an atomicity of the instruction-operand tuple.

In a 33th aspect, the computer-implemented method of any one of aspects 26-32, further comprising releasing a result generated from executing the instruction-operand tuple to a bus for transfer to at least one of a data store or the operand pool.

In a 34th aspect, the computer-implemented method of aspect 33, wherein the result is tagged with an identifier and is accessible for subsequent instructions.

In a 35th aspect, the computer-implemented method of any one of aspects 26-34, wherein the instruction-operand tuple is generated by a functional unit.

In a 36th aspect, the computer-implemented method of any one of aspects 26-35, wherein the operands associated with a decoded instruction comprise an operand in the instruction or a reference to an operand in a data store.

The systems, methods, and devices of this disclosure each have several innovative aspects, no single one of which is solely responsible for various desirable attributes disclosed herein. Although certain embodiments and examples are disclosed herein, inventive subject matter extends beyond the examples in the specifically disclosed embodiments to other alternative embodiments and/or uses, and to modifications and equivalents thereof.

OTHER CONSIDERATIONS

Many other variations than those described herein can be apparent from this disclosure. For example, depending on the embodiment, certain acts, events, or functions of any of the algorithms described herein can be performed in a different sequence, or can be added, merged, or left out altogether (e.g., not all described acts or events may be necessary for the practice of the algorithms). Moreover, in certain embodiments, acts or events can be performed concurrently, e.g., through multi-threaded processing, interrupt processing, multiple processors or processor cores, or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality can be implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine or hardware processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and specifically configured through instructions or architectural elements to perform the functions described herein. The processor can be a microprocessor, controller, microcontroller, state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, can be generally intended to convey that certain embodiments include, while other embodiments do not include, certain features, elements and/or states. Thus, such conditional language can be not generally intended to imply that features, elements and/or states may be in any way required for one or more embodiments, or that one or more embodiments necessarily include logic for deciding, with or without author input or prompting, whether these features, elements and/or states may be included or may be to be performed in any particular embodiment. The terms "comprising," "including," "having," and the like may be synonymous and may be used inclusively, in an open-ended fashion, and do not exclude additional elements, features, acts, operations, and so forth. Also, the term "or" can be used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" can be applied.

Disjunctive language such as the phrase "at least one of X, Y, or Z," unless specifically stated otherwise, can be otherwise understood with the context as used in general to present that an item, term, etc., may be either X, Y, or Z, or any combination thereof (e.g., X, Y, and/or Z). Thus, such disjunctive language can be not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be implemented within a form that does not provide all of the features and benefits set forth herein, as some features can be used or practiced separately from others.

What is claimed is:

1. A computer-implemented method for controlling execution of a process in a microcontroller system, the method comprising:
   under control of one or more hardware processors,
   loading a plurality of instructions of a process for execution by a microcontroller system, wherein the plurality of instructions is associated with priorities of respective instructions of the plurality of instructions and atomicities for respective groups of instructions of the plurality of instructions;
   identifying an instruction of the plurality of instructions to be executed;
   determining an identifier of the process, a priority of the instruction, and an atomicity of the instruction, wherein the priority and the atomicity indicate which instruction should be executed first when multiple instructions are ready for execution;
   parsing the instruction to determine whether the instruction is associated with at least one operand;
   in response to a determination that the instruction is associated with one or more operands, fetching the one or more operands associated with the instruction;
   merging the instruction, the priority of the instruction, the atomicity of the instruction, and the fetched one or more operands in or associated with the instruction to generate a merged instruction-operand tuple;
   generating one or more control signals for the merged instruction-operand tuple, wherein the one or more control signals are used by one or more functional units for controlling an execution of the merged instruction-operand tuple; and
   communicating the merged instruction-operand tuple to a multiple instruction issue queue for execution by the one or more functional units.

2. The computer-implemented method of claim 1, wherein two or more of the following are executed simultaneously:

fetching the identifier of the process the priority of the instruction, and the atomicity of the instruction;
fetching the one or more operands associated with the instruction; or
generating the one or more control signals.

3. The computer-implemented method of claim 1, wherein fetching the identifier of the process and the priority and the atomicity of the instruction comprises at least one of:
computing the priority and the atomicity of the instruction from a range of memory addresses associated with the instruction using a combinational logic; or
searching for the priority and the atomicity of the instruction based on the range of memory addresses received as an input.

4. The computer-implemented method of claim 1, further comprising: initiating storage of the plurality of instructions and the priorities and the atomicities associated with the plurality of instructions when the process is loaded to an embedded computer system or dynamically when the microcontroller system of the embedded computer system is executing the process.

5. The computer-implemented method of claim 1, wherein the priority and the atomicity of the instruction are fetched in response to a determination that the instruction is retrieved from a data store.

6. A system for controlling execution of a microcontroller process, the system comprising:
a plurality of functional units configured to execute a plurality of merged instruction-operand tuples, wherein each merged instruction-operand tuple is associated with a priority and an atomicity and comprises one or more decoded instructions, and wherein the priority and the atomicity associated with each merged instruction-operand tuple indicate which merged instruction-operand tuple should be executed first when multiple merged instruction-operand tuples are ready for execution;
a router unit configured to:
allocate one or more functional units to execute a merged instruction-operand tuple of the plurality of merged instruction-operand tuples; and
control a flow of power and clock pulses of the plurality of functional units by dispatching power and gate clock signals to the plurality of functional units, wherein the flow of power and clock pulses activates the one or more functional units allocated to execute the merged instruction-operand tuple and deactivates functional units not allocated to execute the merged instruction-operand tuple;
an instruction pool configured to:
store a plurality of decoded merged instructions, wherein each decoded merged instruction comprises a decoded instruction merged with the priority and atomicity of the decoded instruction; and
communicate a decoded merged instruction of the plurality of decoded merged instructions to the router unit in response to the determination that the merged instruction-operand tuple comprises one or more operands and all of the one or more operands of the merged instruction-operand tuple are available; and
a matching unit configured to determine availability of the one or more operands of the merged instruction-operand tuple in an operand pool in response to the determination that the merged instruction-operand tuple comprises the one or more operands.

7. The system of claim 6, wherein the router unit is configured to allocate the functional unit and control the flow of power and clock pulses based at least partly on a priority order determined from priorities and atomicities of respective merged instruction-operand tuples in the plurality of instruction-operand tuples.

8. The system of claim 7, wherein a merged instruction-operand tuple with higher priority is executed before a merged instruction-operand tuple with a lower priority.

9. The system of claim 7, wherein a first merged instruction-operand tuple and a second merged instruction-operand tuple each comprise one or more operands, and wherein in response to a determination that the first merged instruction-operand tuple and the second merged instruction-operand tuple have the same priority and all operands for the first merged instruction-operand tuple and the second merged instruction-operand tuple are available, the merged instruction-operand tuple associated with the decoded instruction that is placed in the instruction pool first is executed first.

10. The system of claim 6, wherein the plurality of functional units is associated with more than one type and comprises two or more functional units of a same type.

11. The system of claim 10, wherein at least two of the plurality of merged instruction-operand tuples are executed in parallel.

12. The system of claim 6, wherein a functional unit is configured to release a result generated from executing the merged instruction-operand tuple to a bus for transfer to at least one of a data store or the operand pool.

13. The system of claim 12, wherein the result is tagged with an identifier and is accessible for subsequent instructions.

14. The system of claim 12, wherein the router unit is further configured to allocate a functional unit to join the one or more decoded instructions and the one or more operands of the merged instruction referenced by the one or more decoded instructions.

15. A computer-implemented method for controlling execution of a process in a microcontroller system, comprising:
under control of one or more hardware processors,
accessing a plurality of merged instructions, wherein each merged instruction comprises one or more decoded instructions and is associated with a priority and an atomicity, and wherein the priority and the atomicity indicate which merged instruction should be executed first when more than one merged instruction of the plurality of merged instructions is ready for execution;
determining a priority order based on the priority and atomicity of each merged instruction in the plurality of merged instructions;
assigning functional units to the plurality of merged instructions based at least partly on the priority order;
in response to a determination that all operands associated with a decoded instruction are available:
matching the operands with the decoded instruction to generate an instruction operand tuple; and
communicating the instruction-operand tuple to a functional unit for execution.

16. The computer-implemented method of claim 15, wherein in response to a determination that a first instruction-operand tuple and a second instruction-operand tuple have the same priority, the instruction-operand tuple associated with the decoded instruction placed in an instruction pool first is executed first.

17. The computer-implemented method of claim 15, wherein the functional units include two or more functional units of a same type.

18. The computer-implemented method of claim 15, wherein at least two of the plurality of merged instructions are executed in parallel.

19. The computer-implemented method of claim 15, wherein a merged instruction of the plurality of merged instructions comprises multiple instruction-operand tuples, wherein an operand in the instruction-operand tuple is routed to appropriate functional units according a priority and an atomicity of the instruction-operand tuple.

* * * * *